(12) United States Patent
Li

(10) Patent No.: US 7,570,318 B2
(45) Date of Patent: Aug. 4, 2009

(54) FLAT PANEL DISPLAY WITH CONNECTING PIECE FOR SECURING BUTTON MODULE

(75) Inventor: Qiang Li, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 163 days.

(21) Appl. No.: 11/803,215

(22) Filed: May 14, 2007

(65) Prior Publication Data

US 2007/0263135 A1    Nov. 15, 2007

(30) Foreign Application Priority Data

May 12, 2006    (TW) .............................. 95116848 A

(51) Int. Cl.
*G02F 1/1333*    (2006.01)
(52) U.S. Cl. ...................................................... 349/58
(58) Field of Classification Search .............. 349/58–60
See application file for complete search history.

(56) References Cited

U.S. PATENT DOCUMENTS

| 6,362,860 | B1 | 3/2002 | Sagawa | |
|---|---|---|---|---|
| 2006/0176418 | A1* | 8/2006 | Anderson et al. | 349/58 |
| 2007/0139579 | A1* | 6/2007 | Zhang | 349/58 |

* cited by examiner

*Primary Examiner*—Michelle R Connelly Cushwa
(74) *Attorney, Agent, or Firm*—Wei Te Chung

(57) ABSTRACT

An exemplary flat panel display (1) includes a display module (11), a chassis (13) secured to the display module, a connecting piece (15) attached to the chassis, and a button module (14) attached to the connecting piece. The flat panel display can be efficiently manufactured with a reduced overall cost.

16 Claims, 6 Drawing Sheets

FLAT PANEL DISPLAY WITH CONNECTING PIECE FOR SECURING BUTTON MODULE

FIELD OF THE INVENTION

The present invention relates to a flat panel display having a connecting piece that secures a button module in position.

GENERAL BACKGROUND

Flat panel displays (FPDs) are commonly used as display devices in a variety of products including compact electronic apparatuses. One kind of typical flat panel display includes one or more buttons arranged at a front side thereof, for controlling display parameters of a screen of the flat panel display. The display parameters include, for e.g., contrast, brightness, vertical and horizontal size, and geometric shape integrity.

Referring to FIG. 5, a typical flat panel display 5 includes a front frame 50, a display module 51, a chassis 53, a button module 54, and a back cover (not shown), arranged in that order from left to right. The front frame 50 and the back cover cooperatively define a housing for accommodating the display module 51, the chassis 53, and the button module 54.

Referring also to FIG. 6, the chassis 53 includes a back wall 531 having a central bulging portion, and a bottom wall 533 horizontally extending from a bottom edge of the back wall 531. The bottom wall 533 includes a central horizontal portion (not labeled), and a fixing strip 5332 downwardly extending from the central horizontal portion. A pair of internally threaded posts (not labeled) extends forward from opposite lateral sides of the fixing strip 5332. A pair of threaded fasteners (not labeled) is also provided. When the flat panel display 5 is assembled, the fasteners are extended through holes (not labeled) in the button module 54 and engaged in the internally threaded posts. Thereby, the button module 54 is fixed to the fixing strip 5332.

The size of the fixing strip 5332 is generally substantially less than that of the bottom wall 533. Accordingly, due to inherent limitations in manufacturing the chassis 53, the fixing strip 5332 needs to be manufactured after a preform of the bottom wall 533 is made. Therefore the efficiency of manufacturing the chassis 53 is limited, and the a baseline cost of manufacturing the chassis 53 is correspondingly restricted. The baseline cost of manufacturing the flat panel display 5 is similarly correspondingly restricted.

What is needed, therefore, is a flat panel display that can overcome the above-described limitations or deficiencies.

SUMMARY

An exemplary flat panel display includes a display module, a chassis secured to the display module, a connecting piece attached to the chassis, and a button module attached to the connecting piece. The flat panel display can be efficiently manufactured with a reduced overall cost.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
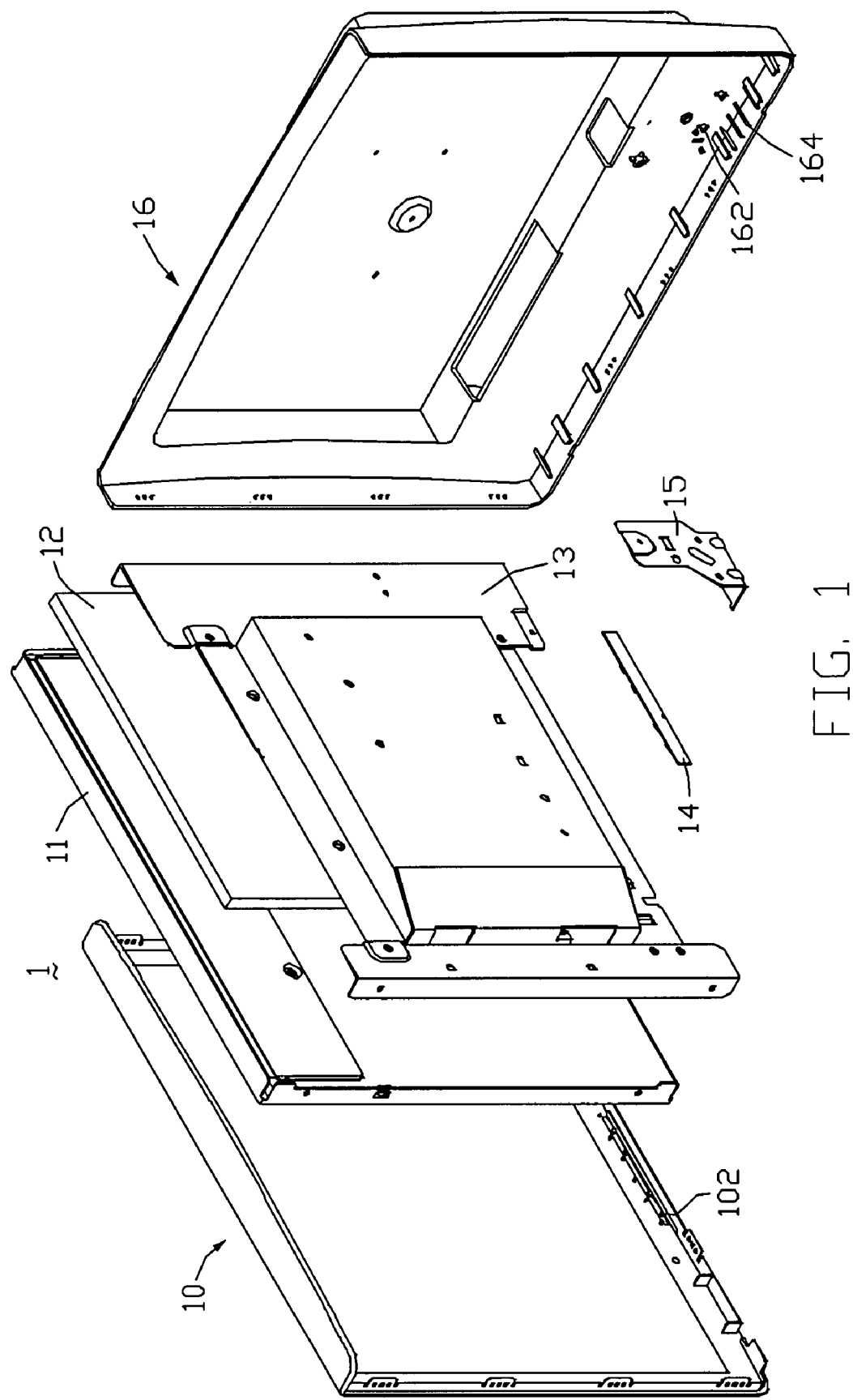
FIG. 1 is an exploded, isometric view of a flat panel display according to an exemplary embodiment of the present invention, the flat panel display including a front frame, a display module, a printed circuit board, a chassis, a button module, a connecting piece, and a back cover.

In FIG. 1, a flat panel display 1 according to an exemplary embodiment of the present invention is shown. The flat panel display 1 includes a front frame 10, a display module 11, a printed circuit board (PCB) 12, a chassis 13, a button module 14, a connecting piece 15, and a back cover 16, arranged in that order from left to right. The front frame 10 and the back cover 16 cooperatively define a first housing (not labeled) for accommodating the display module 11, the PCB 12, the chassis 13, the button module 14, and the connecting piece 15.

The front frame 10 has a generally rectangular shape, and has a size which is slightly greater than a size of the display module 11. The front frame 10 includes a front four-sided bezel portion (not labeled), thus defining a window (not labeled) for allowing viewing of the display module 1. A bottom side of the bezel portion includes a plurality of button holes 102. The front frame 10 is preferably made from plastic, polymer, or another suitable material.

Figure 2:
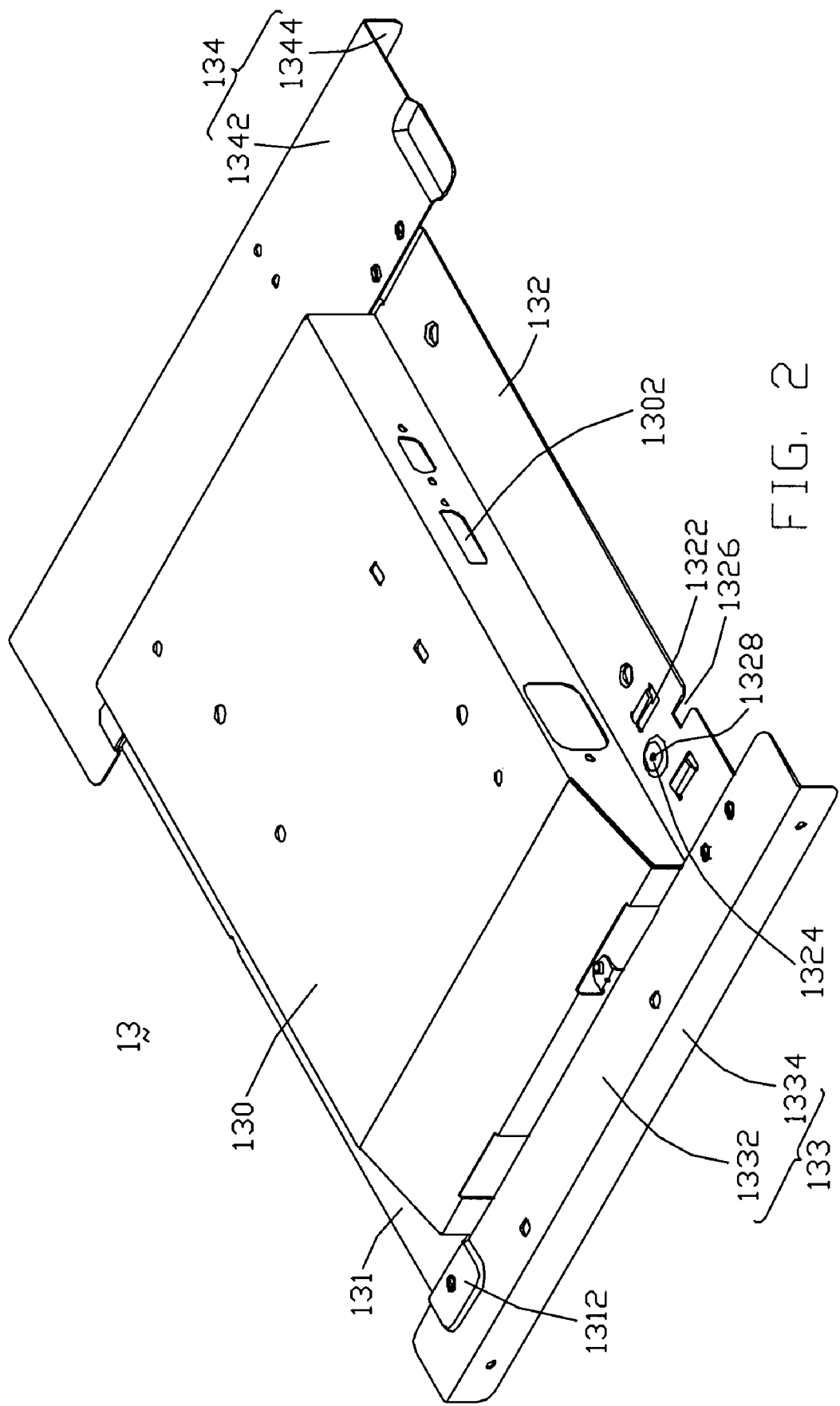
FIG. 2 is an enlarged, isometric view of the chassis of the flat panel display of FIG. 1.

Referring also to FIG. 2, the chassis 13 includes a bulged back wall 130, a first strip 131, a second strip 132, a first location piece 133, and a second location piece 134. The back wall 130 is essentially box-shaped, and defines a first opening (not visible) at a front side thereof between the first and second location pieces 133, 134. The back wall 130 has a plurality of second openings 1302 defined at a bottom side (not labeled) thereof. The chassis 13 is preferably made from iron, steel, aluminum, magnesium, a suitable alloy of any of these metals, or another suitable alloy.

The first location piece 133 and the second location piece 134 are located adjacent two opposite vertical sides of the back wall 130, respectively. The first location piece 133 is elongate with an essentially L-shaped profile, and includes a first wall 1332 and a second wall 1334 perpendicularly extending from the first wall 1332. The second location piece 134 is elongate with an essentially L-shaped profile, and includes a third wall 1342 and a fourth wall 1344 perpendicularly extending from the third wall 1342. The first wall 1332 and the third wall 1342 outwardly extend from the opposite vertical sides of the back wall 130. In the illustrated embodiment, a horizontal width of the third wall 1342 is greater than that of the first wall 1332. The second wall 1334 and the fourth wall 1344 perpendicularly extend forwardly from respective ends of the first and third walls 1332, 1342. A distance between the second wall 1334 and the fourth wall 1344 is slightly greater than a horizontal width of the display module 11. The second wall 1334 and the fourth wall 1344 each define two first mounting holes (not labeled) therein. The first mounting holes respectively correspond to two first threaded holes (not labeled) defined in each of two opposite vertical sides of the display module 11. Thus, the second wall 1334 and the fourth wall 1344 can be attached to the vertical sides of the display module 11 respectively using threaded fasteners such as screws (not shown).

The first strip 131 is elongate and essentially planar, and upwardly extends from a horizontal top end of the back wall 130. The first strip 131 includes two opposite ends 1312, which are fixed to back sides (not labeled) of the first wall 1332 and the third wall 1342 respectively.

The second strip 132 is elongate and essentially planar, and downwardly extends from a horizontal bottom end of the back wall 130. The second strip 132 includes two opposite sliding channels 1322, a protruding portion 1324, and a notch 1326. The sliding channels 1322 are formed at a back surface of the second strip 132, and are parallel and symmetrically opposite to each other. The protruding portion 1324 is located generally between the sliding channels 1322, and has a circular shape. A second threaded hole 1328 is defined in a center of the protruding portion 1324. The notch 1326 is defined at a bottom free edge of the second strip 132, and is directly below the protruding portion 1324. Two opposite ends (not visible) of the second strip 132 are fixed to front sides of the first wall 1332 and the third wall 1342, respectively.

Figure 3:
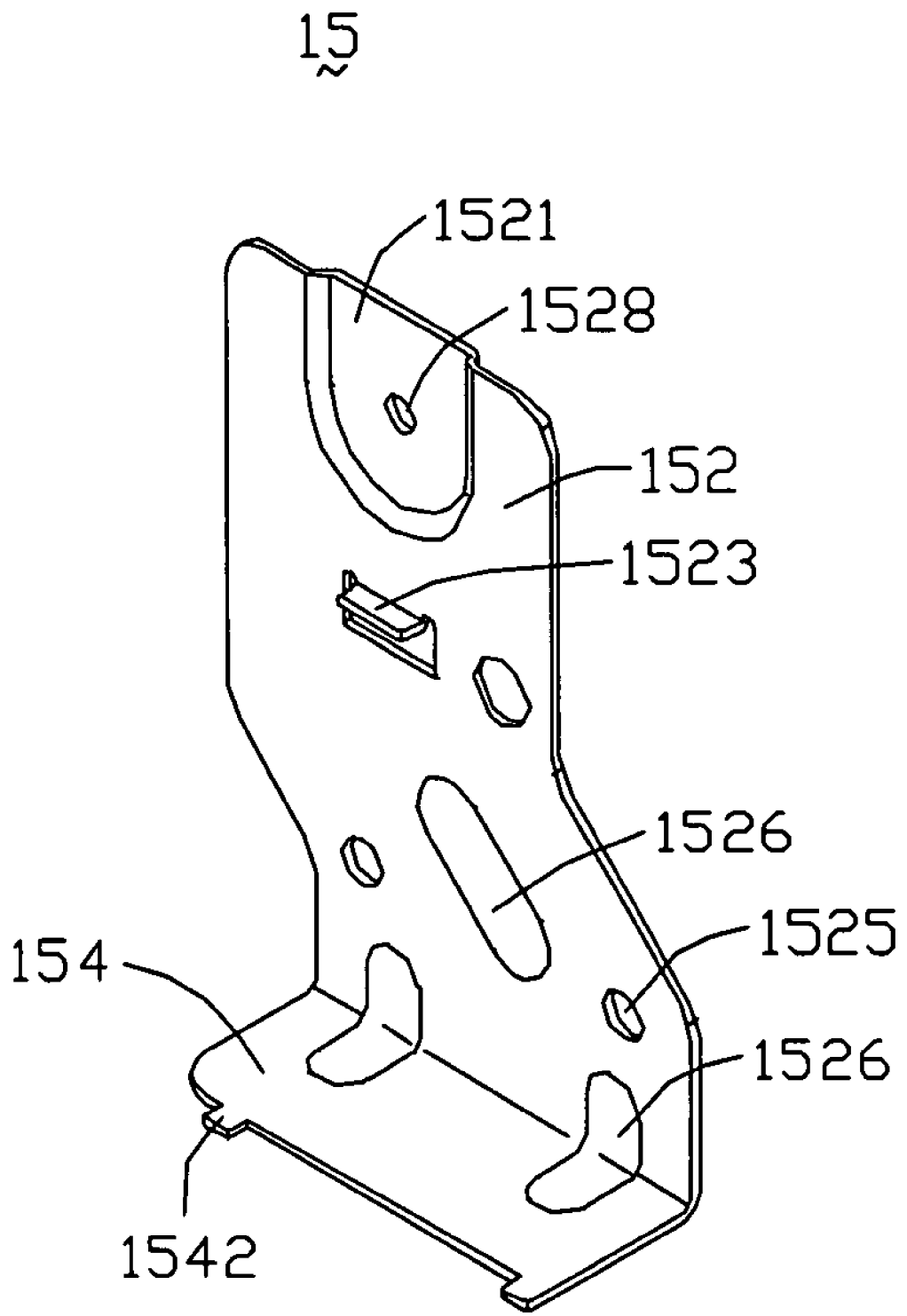
FIG. 3 is an enlarged, isometric view of the connecting piece of the flat panel display of FIG. 1.

Referring also to FIG. 3, the connecting piece 15 is essentially L-shaped, and includes a bent first plate 152 and a second plate 154 perpendicularly extending from the first plate 152. A horizontal width of a main portion (not labeled) of the first plate 152 corresponds to a distance between the sliding channels 1322 of the second strip 132. The first plate 152 includes a recessed portion 1521, a stopper 1523, two fixing holes 1525, and a plurality of first reinforcing ribs 1526. The recessed portion 1521 is located at a top free edge of the first plate 152, and is essentially U-shaped. The recessed portion 1521 corresponds to the protruding portion 1324 of the second strip 132, and includes a second mounting hole 1528 corresponding to the second threaded hole 1328 of the protruding portion 1324. The stopper 1523 is below the recessed portion 1521, and extends from the first plate 152 in a same direction as the second plate 154. In the illustrated embodiment, there are three first reinforcing ribs 1526. One of the first reinforcing ribs 1526 is formed at a central oblique portion of the first plate 152. The other two first reinforcing ribs 1526 are formed at a junction where the first plate 152 and the second plate 154 meet. The second plate 154 includes two fixing tabs 1542 integrally protruding from a front free edge thereof. In the illustrated embodiment, the fixing tabs 1542 are parallel to each other, and are essentially perpendicular to the first plate 152.

Figure 4:
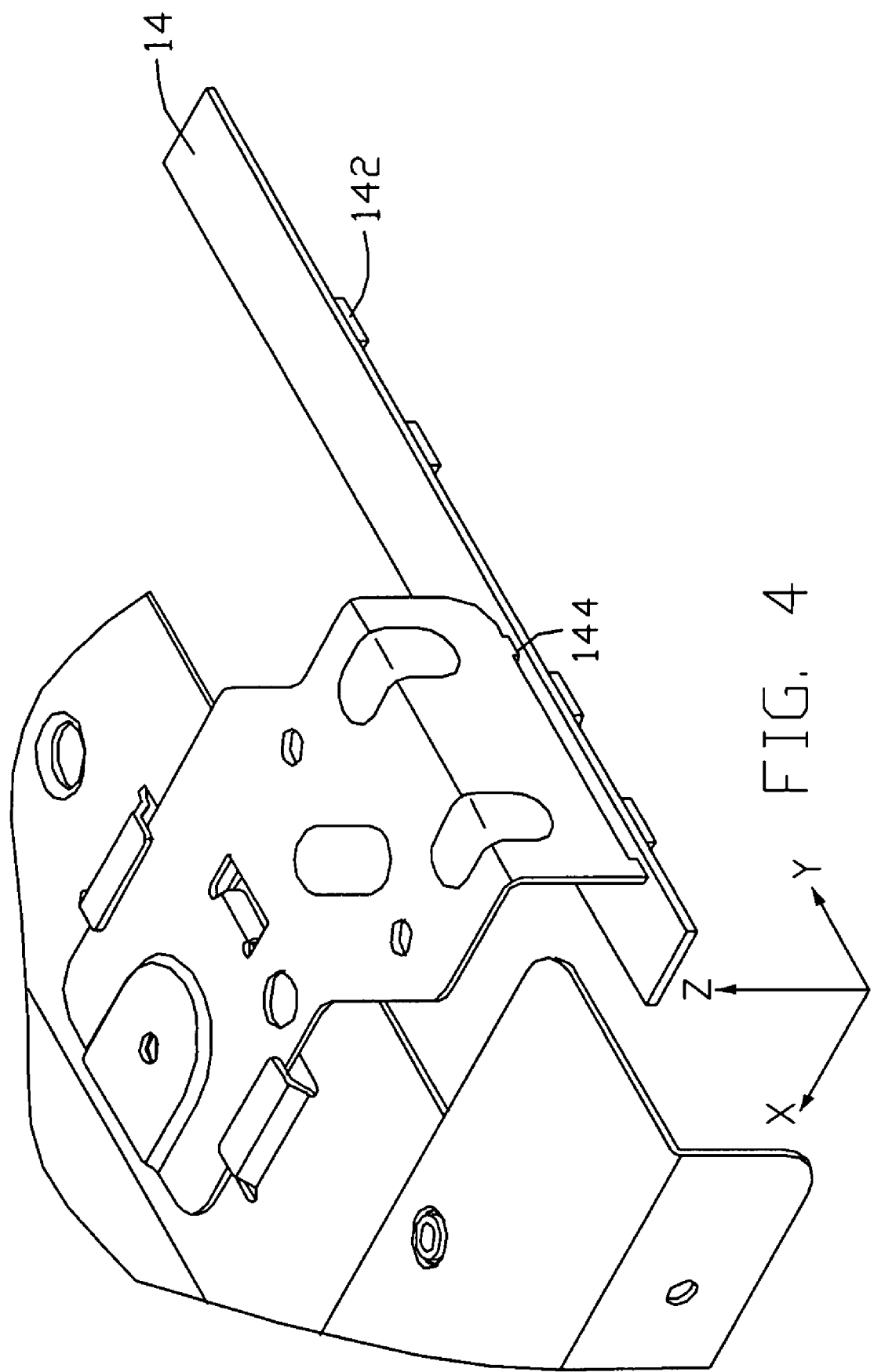
FIG. 4 is an enlarged, isometric view showing the connecting piece attached to the chassis, and the button module localized by the connecting piece.
Figure 5:
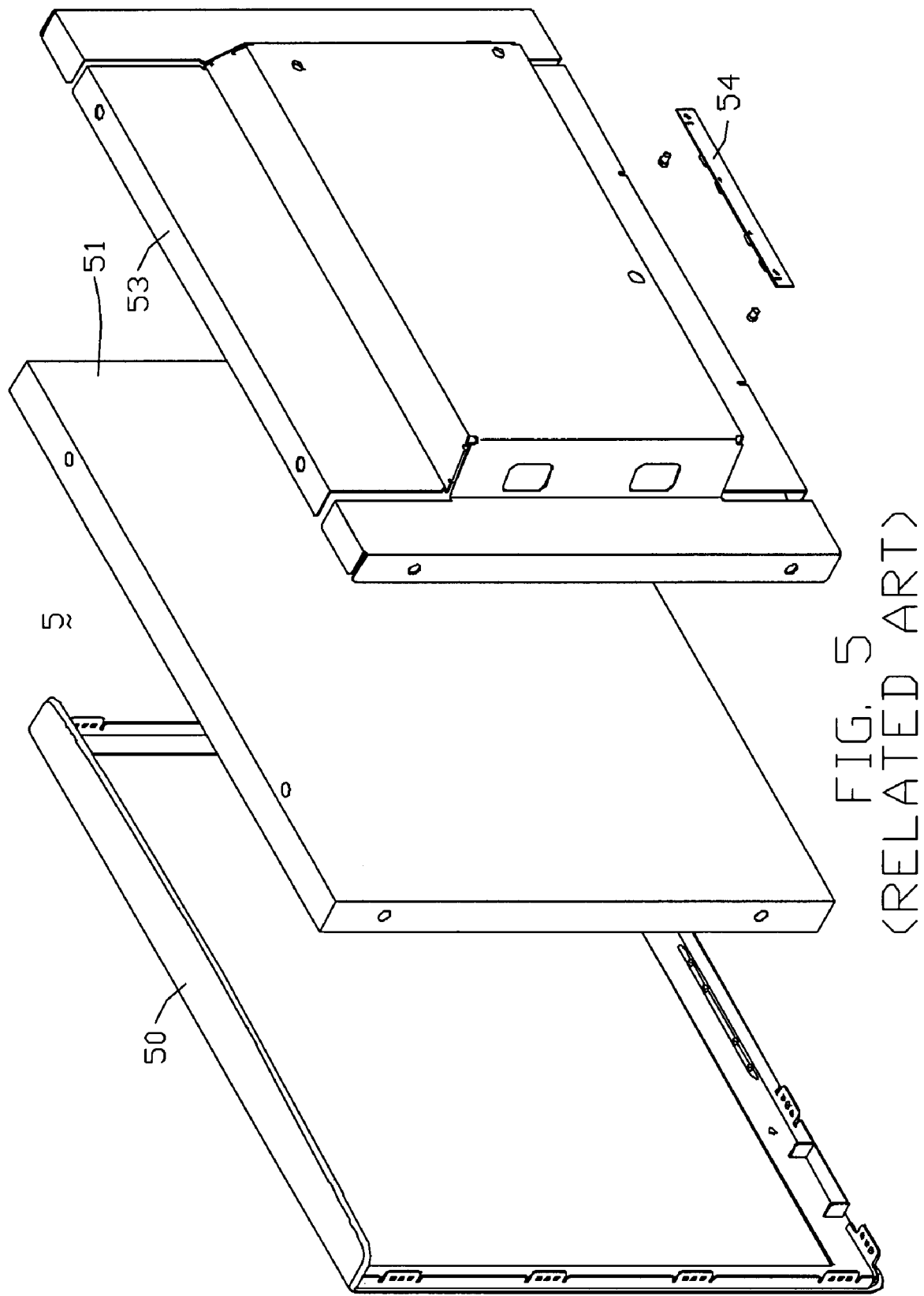
FIG. 5 is an exploded, isometric view of main components of a conventional flat panel display, the flat panel display including a chassis.
Figure 6:
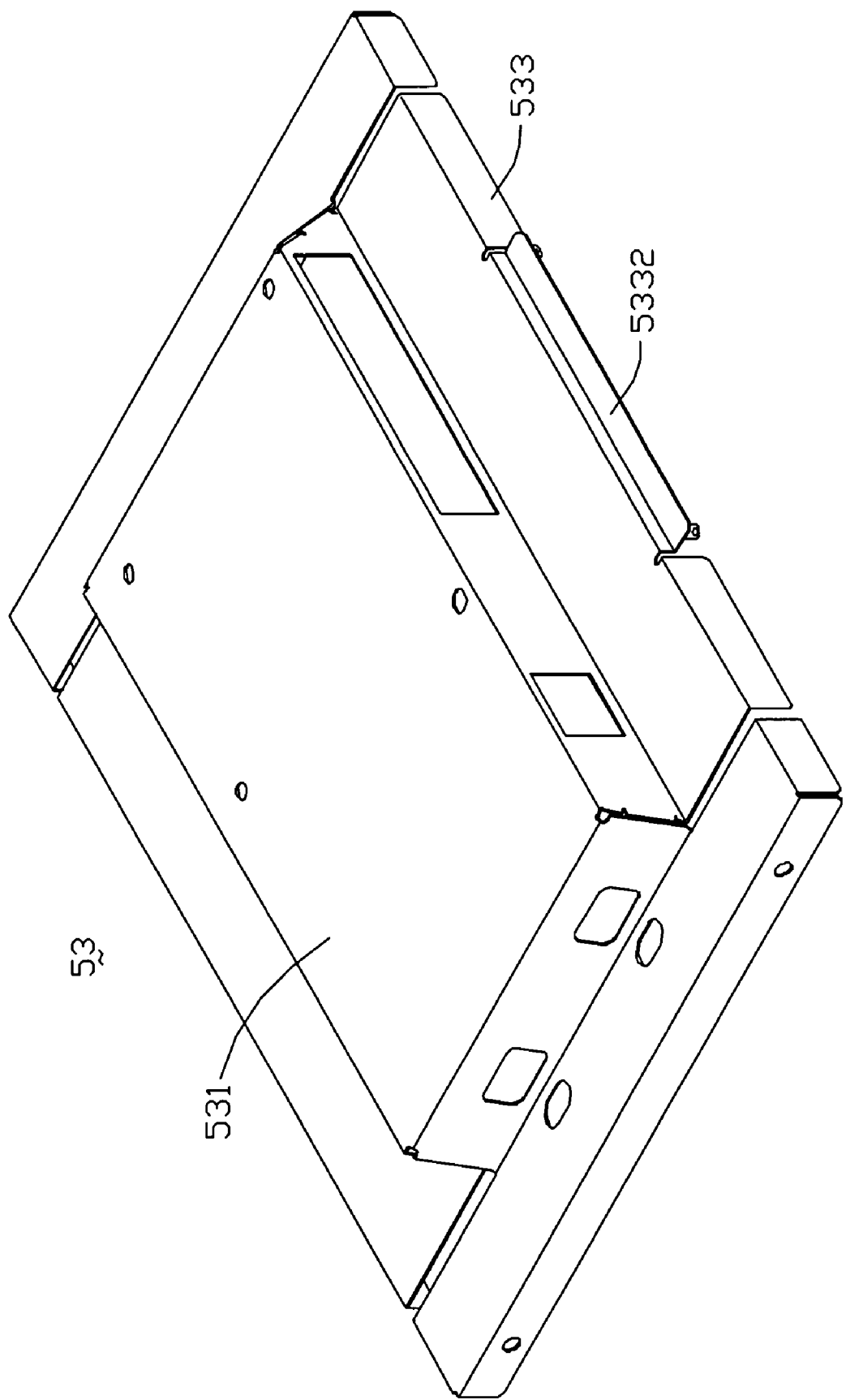
FIG. 6 is an isometric view of the chassis of the flat panel display of FIG. 5.

Referring also to FIG. 4, the button module 14 is essentially planar. The button module 14 includes a plurality of buttons 142 at a front thereof, and two through holes 144. The through holes 144 correspond to the fixing tabs 1542 of the connecting piece 15, respectively.

The back cover 16 has a size substantially the same as a size of the front frame 10, and defines a second housing (not labeled) for accommodating the chassis 16 therein. The back cover 16 includes two location posts 162 at a lower vertical portion thereof, and a plurality of second reinforcing ribs 164 at a bottom horizontal portion thereof. The location posts 162 correspond to the fixing holes 1525 of the connecting piece 15, respectively. The back cover 16 is preferably made from plastic, polymer, or another suitable material.

The flat panel display 1 can be assembled as follows. First, the printed circuit board 12 is electrically connected with the display module 11. Second, the chassis 13 is secured to the display module 11. The second wall 1334 and the fourth wall 1344 are attached to the vertical sides of display module 11, respectively. The printed circuit board 12 is accommodated in the back wall 130 of the chassis 13. Third, the connecting piece 15 is secured to the second strip 132 of the chassis 13. Referring also to FIG. 4, the first plate 152 of the connecting piece 15 is attached to the second strip 132. The protruding portion 1324 of the second strip 132 is covered by the recessed portion 1521 of the first plate 152, and the second threaded hole 1328 is aligned with the second mounting hole 1528. In this position, the stopper 1523 of the connecting piece 15 abuts a portion of the second strip 132 at a top extremity of the notch 1326. Thus, a fastener such as a screw (not shown) can be extended through the second mounting hole 1528 and engaged in the second threaded hole 1328, so that the first plate 152 is securely attached to the second strip 132. Fourth, the button module 14 is attached to the second piece 154 of the connecting piece 15. The fixing tabs 1542 of the connecting piece 15 are fittingly engaged in the through holes 144 of the button module 14. Fifth, the above-described pre-assembled components including the display module 11, the printed circuit board 12, the chassis 13, the button module 14, and the connecting piece 15 are fitted in the front frame 10. The buttons 142 of the button module 14 extend through the button holes 102 and protrude outside the front frame 10, such that the buttons 142 can be conveniently pressed by a user. Sixth, the back cover 16 is attached to the front frame 10. The location posts 162 of the back cover 16 extend through the fixing holes 1525 of the connecting piece 15, respectively. A bottom side (not labeled) of the second piece 154 of the connecting piece 15 is supported by the second reinforcing ribs 164 of the back cover 16.

The button module 14 of the flat panel display 1 is localized by the connecting piece 15 engaged to the chassis 13. Unlike in a conventional flat panel display, there is no need for the chassis 13 to have a small-sized extending portion in order that the button module 14 is fixed in position. Therefore, the efficiency of manufacturing the flat panel display 5 can be improved. Furthermore, a vertical height of the second strip 132 can be reduced because the connecting piece 15 is used. Therefore, the amount of material required for manufacturing the second strip 132 can be reduced. Thus, the overall cost of manufacturing the flat panel display 1 can be correspondingly reduced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A flat panel display comprising:
a display module;
a chassis attached to the display module, the chassis comprising a strip, the strip comprising two symmetrically opposite sliding channels;
a connecting piece attached to the chassis; and
a button module attached to the connecting piece.

2. The flat panel display as claimed in claim 1, wherein the chassis further comprises a bulged back wall, and the strip extends from a bottom end of the back wall.

3. The flat panel display as claimed in claim 1, wherein the connecting piece comprises a first plate and a second plate connected with the first plate.

4. The flat panel display as claimed in claim 3, wherein the connecting piece is essentially L-shaped.

5. The flat panel display as claimed in claim 3, wherein a transverse width of a main portion of the first plate corresponds to a distance between the sliding channels of the strip.

6. The flat panel display as claimed in claim 3, wherein the strip further comprises a protruding portion between the sliding channels.

7. The flat panel display as claimed in claim 6, wherein the first plate comprises a recessed portion corresponding to the protruding portion of the strip.

8. The flat panel display as claimed in claim 6, wherein the strip further comprises a notch defined at a bottom edge thereof, the notch being below the protruding portion.

9. The flat panel display as claimed in claim 8, wherein the first plate further comprises a stopper below the recessed portion, and the stopper is engaged in the notch.

10. The flat panel display as claimed in claim 6, wherein the protruding portion comprise a threaded hole, and the recessed portion comprises a mounting hole aligned with the threaded hole.

11. The flat panel display as claimed in claim 3, wherein the second plate comprises a fixing portion extending therefrom.

12. The flat panel display as claimed in claim 11, wherein the button module comprises a through hole, and the fixing portion is engaged in the through hole.

13. The flat panel display as claimed in claim 3, further comprising a front frame having a plurality of button holes therein, wherein the button module comprises a plurality of buttons, and the buttons are received in the button holes and protrude our from the front frame.

14. The flat panel display as claimed in claim 13, further comprising a back cover, wherein the front frame and the back cover cooperatively define a housing accommodating the display module, the chassis, the button module, and the connecting piece.

15. The flat panel display as claimed in claim 14, wherein the first plate further comprises a plurality of fixing holes.

16. The flat panel display as claimed in claim 15, wherein the back cover comprises a plurality of location posts engaged in the fixing holes of the first plate.

* * * * *